US009596585B2

(12) United States Patent
Abhishek et al.

(10) Patent No.: US 9,596,585 B2
(45) Date of Patent: Mar. 14, 2017

(54) MANAGING ASSOCIATIONS IN AD HOC NETWORKS

(75) Inventors: Abhishek Abhishek, Woodinville, WA (US); Hui Shen, Issaquah, WA (US); Jiandong Ruan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 586 days.

(21) Appl. No.: 11/541,351

(22) Filed: Sep. 29, 2006

(65) Prior Publication Data

US 2008/0031209 A1    Feb. 7, 2008

Related U.S. Application Data

(60) Provisional application No. 60/835,614, filed on Aug. 4, 2006.

(51) Int. Cl.
*H04W 8/00* (2009.01)
*H04W 84/18* (2009.01)

(52) U.S. Cl.
CPC ............ *H04W 8/005* (2013.01); *H04W 84/18* (2013.01)

(58) Field of Classification Search
CPC ..... H04W 92/18; H04W 84/18; H04W 8/005; H04W 84/10; H04W 84/12; H04W 76/02; H04W 76/021; H04L 63/0272; H04L 63/10; H04L 63/20; H04L 12/4641
USPC ..... 370/338, 328, 329, 349; 455/450, 452.1, 455/509
See application file for complete search history.

(56) References Cited

U.S. PATENT DOCUMENTS

| | | | |
|---|---|---|---|
| 6,307,843 B1 | 10/2001 | Okanoue | |
| 6,314,163 B1 * | 11/2001 | Acampora | ............ H04B 10/11 379/56.2 |
| 6,421,717 B1 | 7/2002 | Kloba et al. | |
| 6,757,286 B1 * | 6/2004 | Stone | ........................ 370/395.53 |
| 6,791,949 B1 | 9/2004 | Ryu et al. | |
| 6,842,460 B1 | 1/2005 | Olkkonen et al. | |
| 6,865,371 B2 | 3/2005 | Salonidis et al. | |
| 6,892,230 B1 | 5/2005 | Gu et al. | |
| 6,907,238 B2 | 6/2005 | Leung | |

(Continued)

FOREIGN PATENT DOCUMENTS

| | | |
|---|---|---|
| CN | 1527530 A | 9/2004 |
| EP | 1 241 838 A2 | 9/2002 |

(Continued)

OTHER PUBLICATIONS

International Search Report from corresponding International Application No. PCT/US2007/017507.

(Continued)

*Primary Examiner* — George Eng
*Assistant Examiner* — Jing Gao
(74) *Attorney, Agent, or Firm* — John Jardine; Dan Choi; Micky Minhas

(57) ABSTRACT

A first wireless devices establishes an association with a second wireless device by sending a connection request packet to a previously-discovered second wireless device. The second wireless device identifies the received packet as a connection request and responds with a connection response packet, thereby establishing an association between the first and second wireless devices. The wireless devices can then, for example, send and receive data.

18 Claims, 5 Drawing Sheets

(56) References Cited

U.S. PATENT DOCUMENTS

| | | | |
|---|---|---|---|
| 6,950,628 B1 | 9/2005 | Meier et al. | |
| 7,286,515 B2 | 10/2007 | Olson et al. | |
| 7,298,716 B2 | 11/2007 | Abraham et al. | |
| 7,385,958 B2 | 6/2008 | Demirhan | |
| 7,400,899 B2 | 7/2008 | Shin et al. | |
| 7,436,790 B2 | 10/2008 | Todd et al. | |
| 2003/0054795 A1* | 3/2003 | Tamaki et al. | 455/406 |
| 2003/0096576 A1 | 5/2003 | Salonidis | |
| 2003/0179742 A1 | 9/2003 | Ogier et al. | |
| 2004/0028060 A1* | 2/2004 | Kang | 370/400 |
| 2004/0042434 A1 | 3/2004 | Kennedy | |
| 2004/0077374 A1* | 4/2004 | Terry | 455/552.1 |
| 2004/0152416 A1 | 8/2004 | Dahl | |
| 2004/0203385 A1 | 10/2004 | Narayanan et al. | |
| 2004/0216125 A1 | 10/2004 | Gazda | |
| 2004/0223469 A1 | 11/2004 | Bahl et al. | |
| 2004/0228293 A1 | 11/2004 | Choi et al. | |
| 2004/0233881 A1 | 11/2004 | Kang et al. | |
| 2004/0253996 A1 | 12/2004 | Chen et al. | |
| 2005/0009565 A1 | 1/2005 | Kwak | |
| 2005/0074019 A1 | 4/2005 | Handforth et al. | |
| 2005/0089010 A1 | 4/2005 | Rue et al. | |
| 2005/0117530 A1 | 6/2005 | Abraham et al. | |
| 2005/0135302 A1 | 6/2005 | Wang et al. | |
| 2005/0148315 A1 | 7/2005 | Sawada | |
| 2005/0177639 A1 | 8/2005 | Reunamaki et al. | |
| 2005/0186949 A1 | 8/2005 | Ho | |
| 2005/0198337 A1* | 9/2005 | Sun et al. | 709/230 |
| 2005/0240665 A1 | 10/2005 | Gu et al. | |
| 2005/0249137 A1 | 11/2005 | Todd et al. | |
| 2005/0250487 A1 | 11/2005 | Miwa et al. | |
| 2005/0286478 A1 | 12/2005 | Mela et al. | |
| 2005/0286480 A1 | 12/2005 | Akiyama | |
| 2006/0002349 A1 | 1/2006 | Demirhan | |
| 2006/0039450 A1 | 2/2006 | Fulton et al. | |
| 2006/0041561 A1 | 2/2006 | Singer et al. | |
| 2006/0062220 A1 | 3/2006 | Suga | |
| 2006/0067290 A1 | 3/2006 | Miwa et al. | |
| 2006/0094476 A1* | 5/2006 | Guy | 455/574 |
| 2006/0120301 A1 | 6/2006 | Falck et al. | |
| 2006/0142034 A1* | 6/2006 | Wentink et al. | 455/515 |
| 2006/0155836 A1 | 7/2006 | Chang et al. | |
| 2006/0215601 A1 | 9/2006 | Vleugels et al. | |
| 2007/0002832 A1* | 1/2007 | Sylvain | 370/352 |
| 2007/0189249 A1* | 8/2007 | Gurevich et al. | 370/338 |
| 2007/0248065 A1 | 10/2007 | Banerjea et al. | |
| 2008/0019333 A1* | 1/2008 | Kharia et al. | 370/338 |
| 2008/0031208 A1 | 2/2008 | Abhishek et al. | |
| 2008/0031210 A1 | 2/2008 | Abhishek et al. | |
| 2008/0049688 A1 | 2/2008 | Nakfour et al. | |

FOREIGN PATENT DOCUMENTS

| | | |
|---|---|---|
| EP | 1569411 A1 | 8/2005 |
| JP | 2000-224088 | 8/2000 |
| JP | 2004-128709 | 4/2004 |
| JP | 2005-027280 | 1/2005 |
| JP | 2005-244329 | 9/2005 |
| JP | 2005-347911 | 12/2005 |
| KR | 1020050086056 A | 8/2005 |
| KR | 1020060049450 A | 5/2006 |
| RU | 2231930 C2 | 6/2004 |
| RU | 2273956 C2 | 4/2006 |
| RU | 2273964 C2 | 4/2006 |
| RU | 2005102111 | 3/2007 |
| WO | WO 03/058881 A2 | 7/2003 |
| WO | WO2004098126 A1 | 11/2004 |
| WO | WO2004098128 A1 | 11/2004 |
| WO | WO 2006118497 A1 * | 11/2006 |
| WO | WO 2007/002364 A2 | 1/2007 |

OTHER PUBLICATIONS

Chandra, et al., "MultiNet: Connecting to Multiple IEEE 802.11 Networks Using a Single Wireless Card", http://research.microsoft.com/~bahl/ms_projects/multiple/infocom.pdf.

Kutscher, et al., "Dynamic Device Access for Mobile Users", http://www.informatik.uni-bremen.de/~dku/pub/pwc2003-kutscher-dda.pdf.

Rekimoto, Jun, "SyncTap: synchronous user operation for spontaneous network connection",May 1, 2004, pp. 126-134, http://www.csl.sony.co.ip/person/rekimoto/papers/syncubi.pdf.

Stajano, et al., "The Resurrecting Duckling: Security Issues for Ad-hoc Wireless Networks", 1999, http://www2.ufp.pt/~rmoreira/SA1/05_TheResurrectionDucklingSecurityIssuesAdHocWire.

Chatschik Bisdikian, IBM Research Report: An Overview of the Bluetooth Wireless Technology, Jun. 25, 2001; http://cpscenter.future.co.kr/resource/hot-topic/wpan/RC22109.pdf.

Rekimoto, et al., "Proximal Interactions: A Direct Manipulation Technique for Wireless Networking", 2003, pp. 511-518, IOS Press, http://www.idemployee.id.tue.pl/a_w_m_rauterberg/conferences/INTERACT2003/INTERA.

Salonidis, et al., "Proximity awareness and fast connection establishment in Bluetooth", http://www.ece.umd.edu/~thsalon/publications/mobihoc00e.PDF.

Tseng, et al., "Power-Saving Protocols for IEEE 802.11-BasedMulti-Hop Ad Hoc Networks", 2002, http://www.iks.inf.ethz.ch/education/ss04/seminar/23.pdf.

*A Randomized Power Management Protocol with Dynamic Listen Interval for Wireless Ad Hoc Networks*, Zi-Tsan Chou; Vehicular Technology Conference, 2006. VTC 2006-Spring. IEEE 63rd, vol. 3, May 7-10, 2006 pp. 1251-1255 See the abstract, section II 1)-3), and section III.

*Joint synchronization, routing and energy saving in CSMA/CA multi-hop hybrid networks*, Jurca, D.; Hubaux, J.-P.; Mobile Ad-hoc and Sensor Systems, 2004 IEEE International Conference on Mobil Ad-hoc and Sensor Systems, Oct. 25-27, 2004 pp. 245-254 See the abstract and section III.

*Power Management Mechanism for routing in Ad-Hoc Wireless Networks*, Zabian, Arwa; Mobile Computing and Wireless Communication International Conference, 2006. MCWC 2007. Proceedings of the First, Sep. 17-20, 2006 pp. 44-49 (PA) See the abstract and section II, III.

International Search Report and Written Opinion mailed Jan. 22, 2008 from International Application No. PCT/US2007/017520.

International Search Report and Written Opinion mailed Mar. 6, 2008 from International Application No. PCT/US2007/017508.

Anastasi G. et al., "IEEE 802.11 Ad Hoc Networks: Protocols, Performance, and Open Issues", in "Mobile Ad Hoc Networking", 2004, IEEE Press, Piscataway, NJ, pp. 69-116, XP55003395.

IEEE Std 802.11: Wireless LAN Medium Access Control (MAC) and Physical Layer (PHY) Specifications, IEEE Standard, Aug. 1, 2005, pp. 1-721, XP017603987.

Extended Search Report dated Aug. 9, 2011 from corresponding European Patent Application No. 07836559.0.

Extended Search Report dated Aug. 8, 2011 from European Patent Application No. 07836572.3.

Extended Search Report dated Aug. 9, 2011 from European Patent Application No. 07836560.8.

Final rejection, JP Application No. 2009-523815, Jun. 4, 2012, 2 pgs.

Canadian Office Action, Application No. 2,656,445, mailed Feb. 27, 2014.

"Office Action Received for European Patent Application No. 07836559.0", Mailed Date: Jun. 25, 2014, Filed Date: Aug. 6, 2007, 4 Pages.

"Office Action Issued in Canadian Patent Application No. 2,656,445", Mailed Date: Jul. 24, 2014, 3 Pages.

"Notice of Allowance Issued in Korea Patent Application No. 10-2009-7001997", Mailed date: Sep. 11, 2014, 2 Pages.

"Office Action Issued in Canada Patent Application No. 2,656,445", Mailed Date: Nov. 25, 2014, 3 Pages.

(56) References Cited

OTHER PUBLICATIONS

"Office Action Issued in European Patent Application No. 07836559.0", Mailed Date: Oct. 26, 2015, 7 Pages.
"Office Action Issued in Canadian Patent Application No. 2,656,445", Mailed Date: Oct. 21, 2015, 4 Pages.
"Office Action Issued in Canadian Patent Application No. 2,656,445", Mailed Date: Feb. 22, 2016, 5 Pages.
Third Office Action (200780028665.1), Oct. 31, 2012; China.
"Office Action Issued in Canadian Patent Application No. 2656445", Mailed Date: Apr. 29, 2015, 3 Pages.
"Office Action and Search Report Issued in Norwegian Patent Application No. 20090015", Mailed Date: Sep. 30, 2016, 5 pages.

* cited by examiner

MANAGING ASSOCIATIONS IN AD HOC NETWORKS

CROSS-REFERENCE TO RELATED APPLICATIONS

This application claims the benefit of Provisional Application Ser. No. 60/835,614, filed Aug. 4, 2006, which is hereby incorporated by reference in its entirety.

This application is related to the following applications which are hereby incorporated by reference in their entirety.

1. Provisional Application Ser. No. 60/835,617, filed Aug. 4, 2006 and entitled "WIRELESS SUPPORT FOR PORTABLE MEDIA PLAYER DEVICES."

2. Provisional Application Ser. No. 60/835,618, filed Aug. 4, 2006 and entitled "SYNCHRONIZATION BETWEEN WIRELESS DEVICES WHILE SAVING POWER."

TECHNICAL FIELD

This invention relates to wireless networks and, more particularly, to ad hoc networks of wireless devices that are in proximity to each other.

BACKGROUND

In a typical wireless network, one or more wireless devices are associated with a common wireless access point, which may be connected to a wired network. Communication between wireless devices is through the access point. Such operation is known as the infrastructure operating mode.

The IEEE 802.11 standard for wireless local area networks (LANs) provides for an ad hoc operating mode in which wireless devices communicate directly with each other without the use of a wireless access point or a wired network. However, in order to operate an ad hoc network of wireless devices, the wireless devices require a mechanism to associate with, or connect to, other wireless network devices in proximity. Such a mechanism should have low power consumption, should create limited radio interference and should have high throughput.

SUMMARY

The present invention provides methods and apparatus to establish an association between wireless devices in an ad hoc network. A first wireless device establishes an association with a second wireless device by sending a connection request packet to a previously-discovered second wireless device. The second wireless device identifies the received packet as a connection request and responds with a connection response packet, thereby establishing an association between the first and second wireless devices. The wireless devices can then, for example, send and receive data.

The invention also provides methods to terminate an association between wireless devices and methods to disconnect from an ad hoc network. The invention further provides methods to handle a case where two wireless devices send connection requests to each other concurrently. In this case, the connection request of the wireless device having a larger network address is processed, and the connection request of the wireless device having a smaller network address is canceled. It will be understood that the criteria can be reversed so that the connection request of the wireless device with the smaller network address is processed and the connection request of the wireless device with the larger network address is canceled.

According to a first aspect of the invention, a method is provided to operate a wireless device in an ad hoc network. The method comprises: turning on a radio of a first wireless device in response to a connect call; sending a connection request packet from the first wireless device to a second wireless device; if a connection response packet is received by the first wireless device from the second wireless device within a timeout period, establishing a connection to the second wireless device; and if a connection response packet is not received by the first wireless device from the second wireless device within the timeout period, indicating a connection failure.

According to a second aspect of the invention, a method is provided to operate a wireless device in an ad hoc network. The method comprises: a first wireless device receiving a connection request packet from a second wireless device; if the connection request packet is identified by the first wireless device as a valid connection request, sending a connection response packet to the second wireless device and recording an established connection; and if the connection request packet is not identified by the first wireless device as a valid connection request, remaining in an existing state.

According to a third aspect of the invention, a wireless device comprises: a computing device; a radio; and a wireless module logically connected to the computing device and to the radio, the wireless module comprising a processor programmed with instructions for: turning on the radio in response to a connect call; sending a connection request packet to a second wireless device; if a connection response packet is received from the second wireless device within a timeout period, establishing a connection to the second wireless device; and if a connection response packet is not received from the second wireless device within the timeout period, indicating a connection failure.

DETAILED DESCRIPTION

Embodiments of the invention provide mechanisms for a wireless device to establish an association, or connection, with another wireless device in an ad hoc network. Further embodiments of the invention provide mechanisms to terminate an association between wireless devices and methods for a wireless device to disconnect from an ad hoc network.

These mechanisms involve software in the wireless devices. The mechanisms can also be implemented in hardware and/or firmware of a wireless device. This allows wireless devices having these mechanisms to communicate and to form ad hoc wireless networks. The communication between wireless devices in the ad hoc network has no effect on other wireless devices that do not support these mechanisms.

Figure 1:
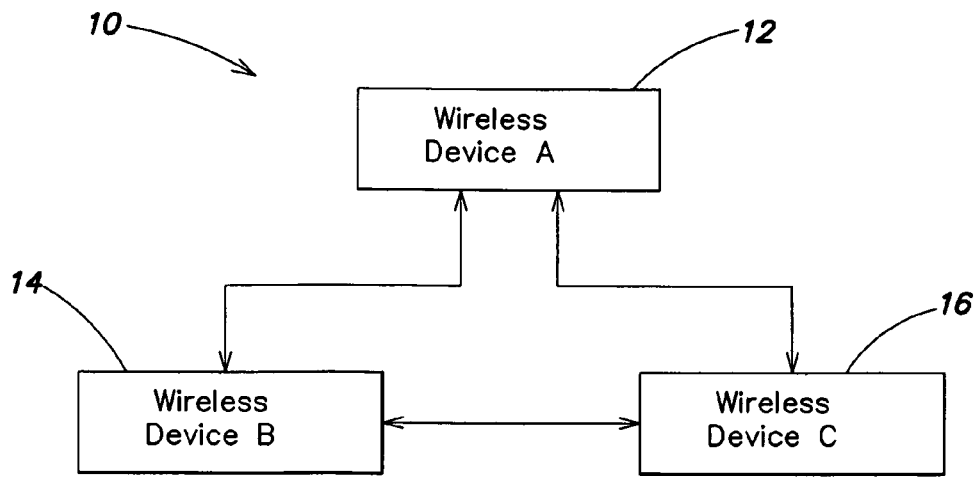
FIG. 1 is a simplified block diagram of an ad hoc wireless network.

An example of a wireless ad hoc network 10 is shown in FIG. 1. Wireless devices 12, 14 and 16 communicate with each other by a wireless links. The wireless devices communicate using the mechanisms described below. It is assumed that each wireless device is within radio range of at least one other wireless device in the ad hoc network. It will be understood that all wireless devices in the ad hoc network do not need to be within radio range. For example, wireless devices 14 and 16 may be able to communicate directly with wireless device 12 but may not be able to communicate directly with each other. By way of example only, wireless devices 12, 14 and 16 may be laptop computers, mobile phones, mobile data devices, portable media player devices, home stereos, wireless speakers, or combinations of such devices which utilize a compatible protocol as described below.

Figure 2:
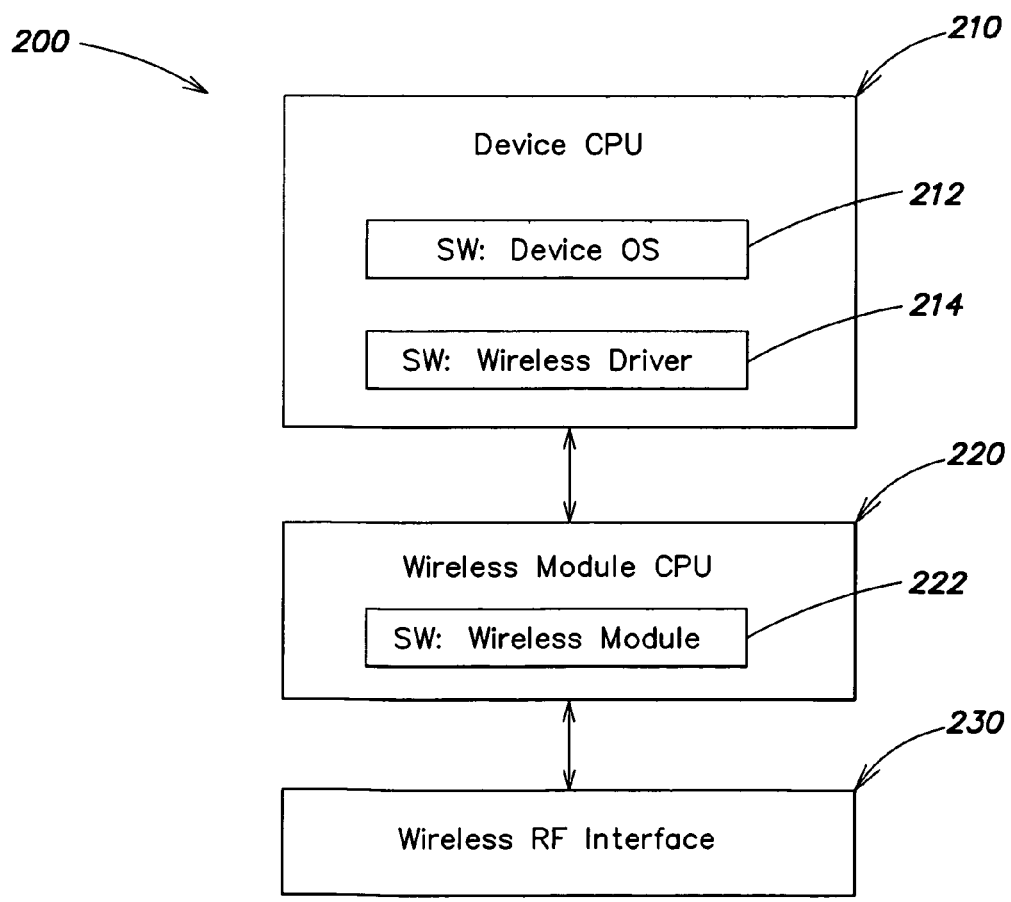
FIG. 2 is a simplified block diagram of a wireless device suitable for forming an ad hoc wireless network.

A simplified block diagram of a wireless device 200 including components involved in communication in an ad hoc network is shown in FIG. 2. Wireless device 200 may correspond to wireless devices 12, 14 and 16 shown in FIG. 1. An upper layer device CPU 210 interfaces with peripheral components present in the wireless device, such as a display, a keypad or a keyboard, a pointing device, a storage unit such as a disk unit or a flash memory and any other peripheral components of the device. Device CPU 210 includes a device operating system 212 and a wireless driver 214. The wireless driver 214 communicates with a second layer wireless module CPU 220 containing wireless module software 222. The wireless module software 222 interfaces with a lower layer wireless RF interface 230 which communicates with a radio that transmits and receives RF signals via an antenna.

The wireless device 200 may represent a variety of different devices that may be hand-held and mobile or stationary. Examples of wireless devices include, but are not limited to, laptop computers, desktop computers, mobile data devices, mobile phones, stereo systems, and wireless speakers.

The operations of each wireless device in establishing associations with other wireless devices are described below. Operation is described in connection with the IEEE 802.11 standard. However, the present invention is not limited to the 802.11 standard and can be utilized in connection with other wireless protocols, such as Ultra Wide Band and WiNet. It will be understood that the operations described below are embodiments only and are not limiting as to the scope of the invention.

Prior to establishing associations as described below, each wireless device discovers other wireless devices in the ad hoc network. Preferred techniques for discovering wireless devices are described in the related applications referenced above. However, other discovery techniques may be utilized. After an association is established, data can be sent and received by the associated wireless devices.

Establish an Association with a Wireless Device in Ad Hoc Networks

Figure 3:
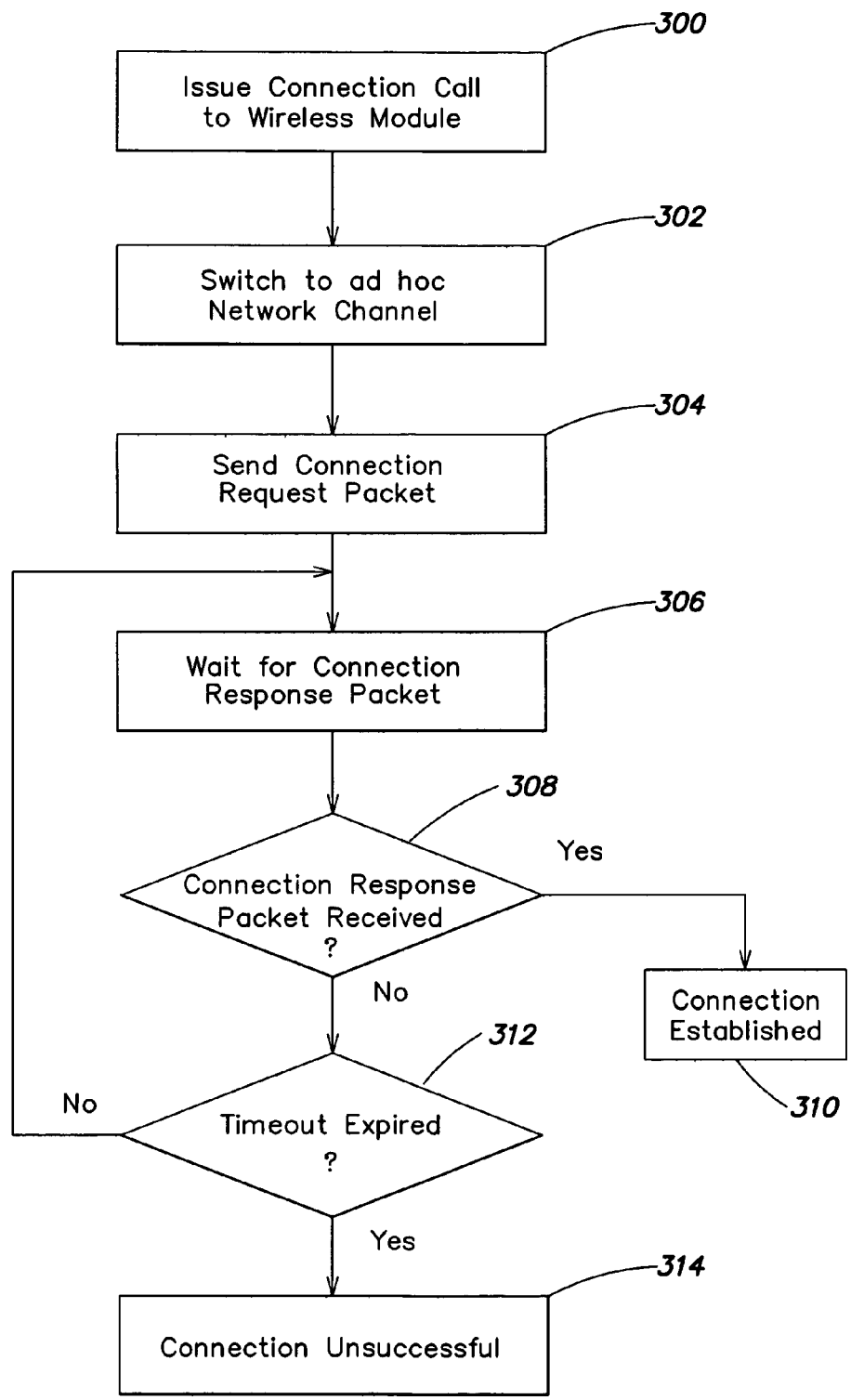
FIG. 3 is a flow chart of operations performed by a first wireless device to establish a connection to a second wireless device.

A flow chart of operations performed by a first wireless device to establish an association with a second wireless device in an ad hoc network is shown in FIG. 3.

If a wireless device decides to establish an association with another device in an ad hoc network, it becomes an association requestor and does the following:

1) Set the following settings:
    Channel number or frequency (of the ad hoc network),
    Desired SSID (of the target ad hoc network to associate with),
    Desired BSSID (of the target ad hoc network to associate with), and
    Mac address (of the target device to associate with).
2) The wireless service issues a connection call to the wireless module, step 300.
    Connect (to associate with a device in an ad hoc network with Mac address and the BSSID/SSID as configured above)
3) Upon receiving a connect call from the upper layer, the wireless module does the following:
    Switch the channel or frequency to the one the ad hoc network is operating on if the channel/frequency is different, step 302.
    Send out a connection request packet, step 304, which may contain the following information:
        Receiver address: target device's MAC address
        BSSID: BSSID of the ad hoc network
        BSS type: ad hoc
        SSID: (optional)
        Special IE: (optional)
            Operation type—virtual association request
            Other optional configuration and capability information, such as supported data rates
        The wireless device can use, but is not limited to, a unicast probe request packet or an authentication packet to convey connection request information, provided that the packet format and content are agreed and understood by the wireless devices.
4) After sending a connection request packet, the wireless module waits for a connection response packet, step 306.
    The wireless device needs to identify that a connection response packet is used to establish an association in the ad hoc network. It can do so in different ways, provided the way is mutually agreed by the devices involved in the association process. Here are some examples:
    a. Match a direct probe response packet with a special IE (information element) that specifies the intention of the connection response. The packet can have the following information:
        Packet type: direct (unicast) probe response packet
        Receiver address: matches association request's MAC address
        BSSID: matches BSSID of the ad hoc network
        BSS type: ad hoc
        Special IE:
            Operation type—virtual association request
            Virtual association status—IEEE 802.11 status code
            Other optional configuration and capability information, such as supported data rates
    b. Match a connection response packet with a packet pattern that is agreed and understood by the wireless devices. Receiving this packet means an acceptance of the association request from the association responder. For example, a matched packet pattern may be:
Packet type: direct (unicast) authentication packet
Receiver address: matches association request's MAC address
BSSID: matches BSSID of the ad hoc network
BSS type: ad hoc
SSID: matches SSID of the ad hoc network
Special IE: (optional)
   Configuration and capability information, such as supported data rates 5) The wireless module waits for such connection response packet, step 308, until a timeout value expires, step 312. This timeout value can have a default value and is configurable. If the connection response packet is received and the connection is successful, step 310, then the wireless module updates its internal state to be associated to the target wireless device.
If this is the first device that it associates with, then the wireless module indicates a media connected event to the network stack.
The wireless module can optionally indicate that a new association has been established with the peer device by sending a notification such as a port up event to the network stack.

6) If a connection response packet is not received, step 308, and the timeout expires, step 312, the connection is not successful, step 314, and the wireless module remains in its original state.

Figure 4:
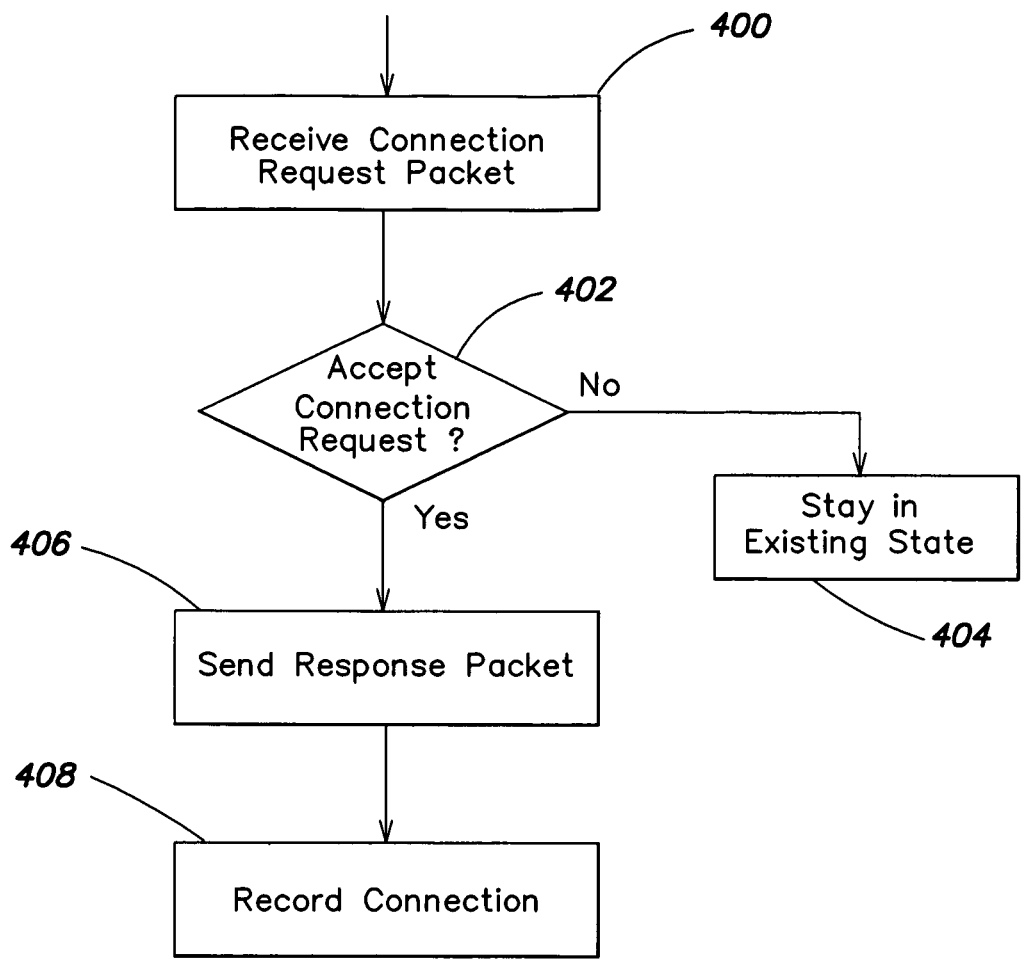
FIG. 4 is a flow chart of operations performed by the second wireless device to establish a connection to the first wireless device.

A flow chart of operations performed by the second wireless device in responding to the connection request by the first wireless device is shown in FIG. 4.

If a wireless device in an ad hoc network receives a unicast connection request packet from another wireless device (the association requestor), step 400, it becomes an association responder and does the following:

1) Identify that a connection request packet is received to establish an association in the ad hoc network. The wireless device can do so in various ways, provided the way is mutually agreed by the devices involved in the association process. Here are two examples:
  a. Match a direct probe request packet with a special IE that specifies the intention of the connection request. The format of the direct probe request packet is understood by the wireless devices and can have the following information:
    Packet type: direct (unicast) probe request packet
    Receiver address: matches association request's MAC address
    BSSID: matches BSSID of the ad hoc network
    BSS type: ad hoc
    Special IE:
      Operation type—virtual association request
      Other optional configuration and capability information, such as supported data rates
  b. Match a connection request packet with a packet pattern that is agreed and understood by the wireless devices. Receiving this packet means an association request from association requestor. For example, a matched packet pattern could be:
    Packet type: direct (unicast) authentication request
    Receiver address: matches association responder's MAC address
    BSSID: matches BSSID of the ad hoc network
    BSS type: ad hoc
    SSID: matches SSID of the ad hoc network
    Special IE: (optional)
      Configuration and capability information, such as supported data rates 2) The wireless module decides whether to accept the association, step 402, and sends out a connection response packet, step 406, which may contain the following information:
Receiver address: association initiator's MAC address
BSSID: BSSID of the ad hoc network
BSS type: ad hoc
SSID: (optional)
Special IE: (optional)
  Operation type—virtual association response
  Virtual association status—IEEE 802.11 status code
  Other optional configuration and capability information, such as supported data rates
The wireless device can use, but is not limited to, a unicast probe response packet or an authentication packet to convey connection response information, provided that the packet format and content are agreed and understood by the wireless devices.

3) If the association is accepted, the association responder does the following:
If the association requestor is the first one associated with the wireless device, then the wireless module indicates a media connected event to the network stack, step 408.
The wireless module can optionally indicate that a new joiner has established an association by sending a notification such as a port up event to the network stack.

4) Otherwise, the association is not accepted, step 402, and the association responder stays in its original state, step 404.

When both wireless device are in the same ad hoc network and indicate media connected and/or port up to the network stack, a wireless connection is established. The wireless devices can transmit and receive data packets to and from the peer devices.

Figure 5:
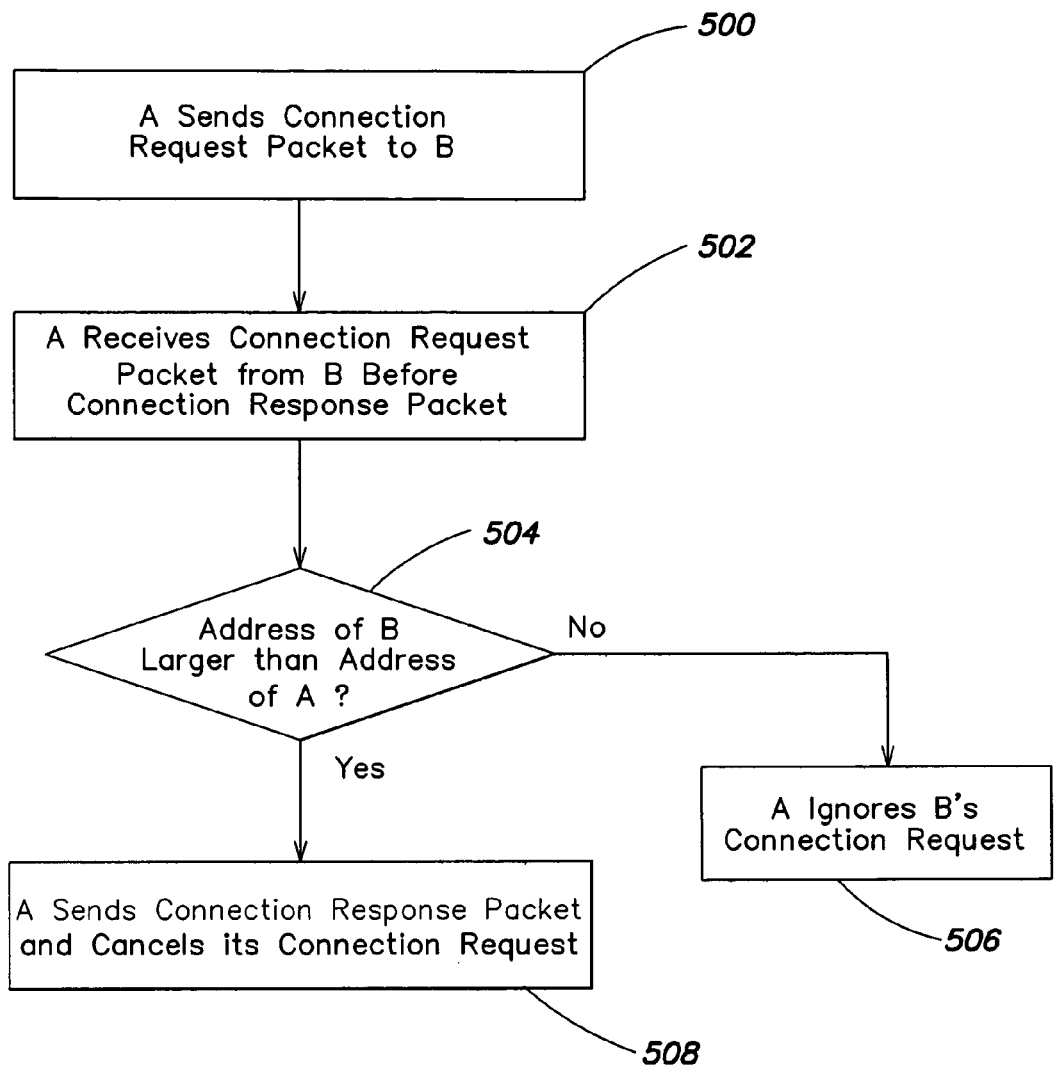
FIG. 5 is a flow chart of operations performed by a wireless device when concurrent connection requests are sent by two wireless devices.

Handle Simultaneous Association Requests Between Two Wireless Devices in Ad Hoc Networks A flow chart of operations performed by a first wireless device when two wireless devices send connection requests to each other concurrently is shown in FIG. 5.

It is possible that two wireless devices A and B send out connection requests to each other concurrently, and wait for a connection response from the other. In this case, the two wireless devices may avoid establishing two associations with each other. After a device (A) sends out a connection request to another device (B), step 500, and device A receives a connection request from device B before it receives a connection response from the same device B within the timeout, step 502, device A does the following:

1) If the value of device B's MAC address is less than device A's MAC address, step 504, then device A ignores B's connection request, step 506.
2) If the value of device B's MAC address is larger than device A's MAC address, step 504, then device A replies to device B's connection request by sending a connection response, step 508. Meanwhile, device A also cancels its own state and operation for the connection request that device A sent to device B.

It will be understood that the criteria can be reversed so that the connection request of the wireless device with the smaller network address is processed and the connection request of the wireless device with the larger network address is canceled.

Monitor Associations

The wireless device may maintain a list of associated wireless devices internally and may monitor packets from the associated peer devices. If the wireless device does not receive any in-IBSS packets from an associated wireless device in the ad hoc network for certain amount of time, it may disassociate from this device.

A packet is deemed as in-IBSS if and only if it has a BSSID that matches the one used by the ad hoc network.

Terminate an Association with a Wireless Device in Ad Hoc Networks

Figure 6:
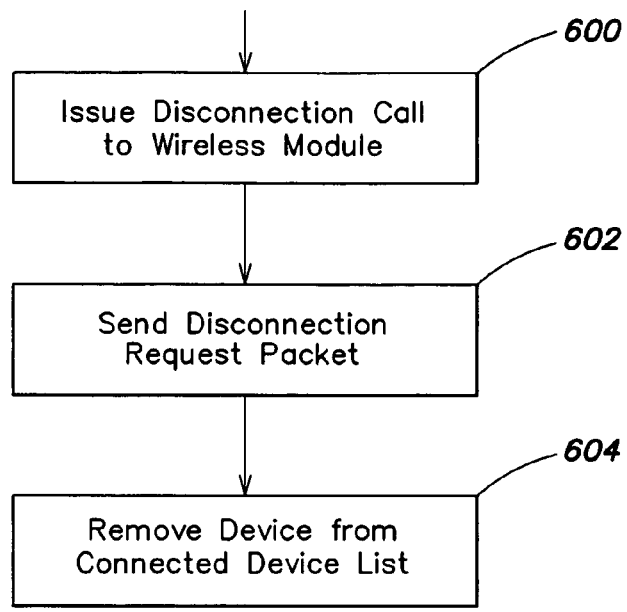
FIG. 6 is a flow chart of operations performed by a first wireless device to terminate a connection to a second wireless device.

A flow chart of operations performed by a wireless device to terminate an association with another wireless device is shown in FIG. 6.

If a wireless device decides to terminate an association with another device in an ad hoc network, it does the following:

1) Set the following settings:
   Desired SSID (of the target ad hoc network to disassociate with),
   Desired BSSID (of the target ad hoc network to disassociate with), and
   Mac address (of the target device to disassociate with).
2) Issues a disconnection call to wireless module, step 600.
   Disconnect (to disassociate with a device in an ad hoc network with Mac address and the BSSID/SSID as configured above)
3) Upon receiving a disconnect call, or the wireless module decides to disassociate from another wireless device due to its aging function as described above, the wireless module does the following:
   Search the internal associated wireless device list for the device.
   If such an associated device cannot be found, then return an appropriate error.
   Otherwise, send out a disconnection request packet, step 602, which may contain the following information:
   Receiver address: target device's MAC address
   BSSID: BSSID of the ad hoc network
   BSS type: ad hoc
   SSID: (optional)
   Special IE: (optional)
       Operation type—virtual association request
       Other optional configuration and capability information, such as supported data rates
   The wireless device can use, but is not limited to, a unicast probe request packet or a de-authentication packet to convey the disconnection request information, provided that the packet format and content are agreed and understood by the wireless devices.
4) After sending a disconnection request packet, the wireless module can immediately remove the device from its associated device list, step 604. The wireless device stops sending any data packets to the disassociated wireless device and drops received data packets from that device.
   If the disassociated device is the last one in the associated device list, then the wireless device indicates a media disconnected event to the network stack and deems itself leaving the ad hoc network.
   The wireless device can optionally indicate that an association with the peer device has been removed by sending a notification such as a port down event to the network stack.

Figure 7:
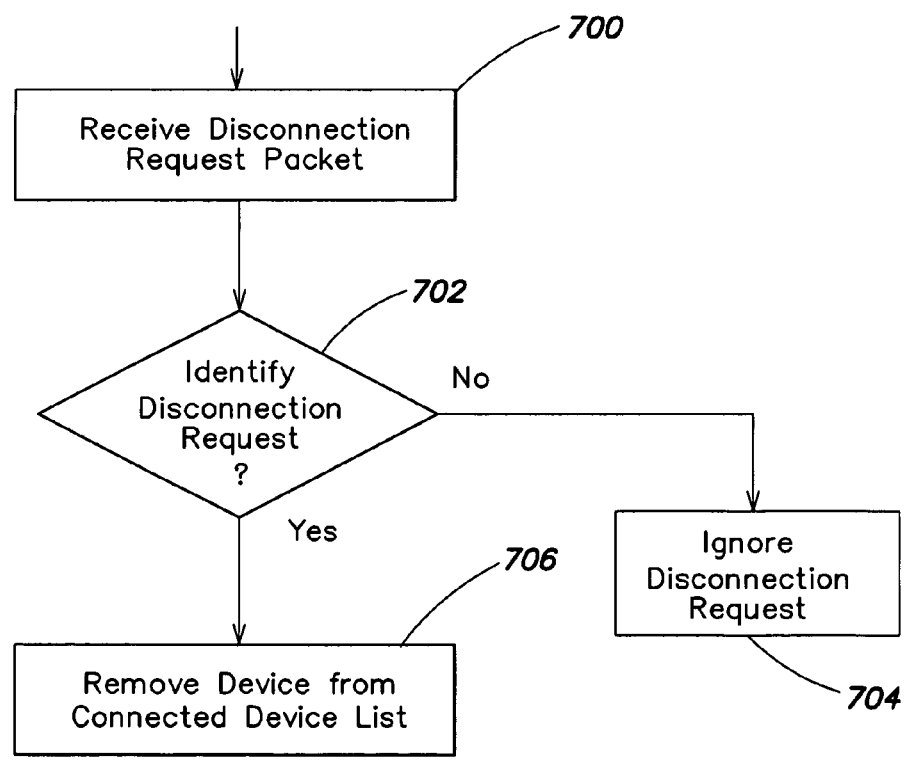
FIG. 7 is a flow chart of operations performed by the second wireless device to terminate the connection to the first wireless device.

A flow chart of operations performed by a wireless device in response to receiving a disconnection request is shown in FIG. 7.

If a wireless device in an ad hoc network receives a unicast disconnection request packet from another wireless device, step 700, it does the following:

1) The wireless device needs to identify a disconnection request packet that is used for terminating an association in ad hoc network, step 702. It can do so in various ways, provided the way is mutually agreed and understood by the devices involved in the association process. Here are two examples:
   a. Match a special IE in a direct probe request packet to specify the intention of the disconnection request. The format of the special IE is understood by the wireless devices and can have the following information:
   Packet type: direct (unicast) probe request packet
   Receiver address: matches association request's MAC address
   BSSID: matches BSSID of the ad hoc network
   BSS type: ad hoc
   Special IE:
       Operation type—virtual disassociation request
   b. Match a connection request packet with a packet pattern that is agreed and understood by the wireless devices. Receiving this packet means a disassociation request. For example, a matched packet pattern may be:
   Packet type: direct (unicast) de-authentication request
   Receiver address: matches association responder's MAC address
   BSSID: matches BSSID of the ad hoc network
   BSS type: ad hoc
   SSID: matches SSID of the ad hoc network
2) After receiving a disconnection request packet, the wireless device does the following:
   Search the internal associated wireless device list for the device.
   If such an associated device cannot be found, then ignore the disconnect request packet, step 704.
   Otherwise, the wireless device can immediately remove the device from its associated device list, step 706. The wireless device stops sending any data packets to the disassociated wireless device and drops received data packets from that device.
   If the disassociated device is the last one in the associated device list, then the wireless device indicates a media disconnected event to the network stack and deems itself leaving the ad hoc network.
   The wireless device can optionally indicate that an association has been removed with the peer device by sending a notification such as a port down event to the network stack.

Disconnect from an Ad Hoc Network

If a wireless device decides to leave an ad hoc network, it does the following:

1) Issue a disconnect call to wireless module
2) After receiving a disconnect call from upper layer, the wireless module does the following to leave the ad hoc network:

Indicate a media disconnect event to the network stack.
Stop sending any data packets to devices in the ad hoc network and drop received data packets from devices in the ad hoc network.
Clean up the internal list of associated wireless devices.
Clean up other internal states.

Special Information Element

The information element (IE) is a type-length-value object that used to carry variable length information.) The wireless device can optionally rely on the special information element to carry information for managing associations.

The special IE can either use a unique IE ID, or a customer IE ID (e.g., value 221 defined by IEEE 802.11 standard) with a unique OUI and OUI type combination to identify itself.

| IE ID (1 byte) | Length (1 byte) | OUI (3 byte) | OUI Type (1 byte) | Other information (0-249 bytes) |
|---|---|---|---|---|
| 221 | 8..253 | (e.g. 00-50-F2 for Microsoft) | (unique value with the same OUI) | Other information for association |

The special information element can contain the following information for managing the association:
  Operation type
  Virtual association request
  Virtual association response
  Virtual disassociation request
  Other information (optional)
  Data rates
  Capability information The above description provides examples of values for various parameters, such as packet parameters. It will be understood that such values are given by way of example only and are not in any way limiting as to the scope of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method performed by a first wireless device, the method comprising:
  attempting to join an ad hoc network, the ad hoc network comprising one or more wireless devices, including at least a second wireless device, the one or more wireless devices each participating in the ad hoc network by operating in an ad hoc mode, the one or more wireless devices each using a same basic service state identifier (BSSID) when exchanging packets to implement the ad hoc network, the attempting to join comprising:
  using a radio of the first wireless device in response to a connect call of the first wireless device;
  sending, via the radio, a connection request packet from the first wireless device to the second wireless device after the second wireless device has been recognized by the first wireless device, the connection request packet comprising a standard packet-type indicator indicating a standard unicast probe request packet or indicating a standard unicast authentication packet, wherein the standard packet-type does not indicate a standard association request packet, the connection request packet comprising a standard BSSID-field comprising the BSSID, the connection request packet further comprising a standard receiver-field containing a media access control (MAC) address of the second wireless device, the connection request packet further comprising a special information element that contains an operation-type identifier that identifies an operation type of the connection request packet as being a virtual association operation with respect to the ad hoc network, wherein the second wireless device is configured to transmit a connection response packet by determining that the connection request packet is a request to associate by matching the BSSID of the ad hoc network with the BSSID from the connection request packet, the operation-type indicator in the special information element, and by matching the MAC address of the second wireless device with the MAC address from the connection request packet; and
  response to receiving, via the radio, the connection response packet from the second wireless device, joining the ad hoc network by associating with the second wireless device.

2. A method as defined in claim 1, further comprising:
  the first wireless device receiving a second connection request packet from the second wireless device;
  determining whether the second connection request packet is a virtual association request, and in accordance therewith, sending a second connection response packet to the second wireless device and recording an established connection.

3. A method as defined in claim 1, further comprising:
  receiving a second connection request packet from the second wireless device before receiving the connection response packet from the second wireless device;
  determining whether the MAC address of the second wireless device from the second request packet meets a criteria with respect to a MAC address of the first wireless device, and when so determined sending a second connection response packet to the second wireless device and canceling a connection request of the connection request packet; and
  determining whether the MAC address of the second wireless device does not meet the criteria with respect to the MAC address of the first wireless device, and when so determined not forming an association based on the second connection request packet received.

4. A method as defined in claim 1, further comprising switching the radio to an ad hoc network channel in response to the connect call.

5. A method as defined in claim 1, further comprising monitoring packets from a third wireless device wirelessly associated with the first wireless device, determining whether a packet has not been received from the third wireless device for a predetermined time, and based thereon determining whether to dissociate from the third wireless device.

6. A method as defined in claim 1, further comprising:
  sending a disconnection request packet from the first wireless device to the second wireless device in response to a disconnection call; and
  removing the second wireless device from a connected-devices list.

7. A method as defined in claim 1, further comprising:
  receiving from the second wireless device a request packet comprising a second special information element and comprising a standard packet-type field comprising a standard unicast probe request indicator or a standard unicast authorization indicator, and in response determining whether the request packet represents a virtual disassociation request by determining that the second special information element contains an operation indicator indicating a virtual disassociation request; and based on the determining whether the request packet represents a disassociation request, dissociating from the second wireless device by removing the second wireless device from a connected-devices list.

8. A method to operate a first wireless device in an IBSS (independent basic service set) ad hoc network in which any wireless devices participating in the ad hoc network does so by operating in an ad hoc mode, the IBSS ad hoc network having a corresponding network identifier that identifies the IBSS ad hoc network, the network identifier comprising a service set identifier (SSID) or a basic service set identifier (BSSID), the method performed by the first wireless device and comprising:

receiving a connection request packet from a previously-discovered and previously authenticated second wireless device, the connection request packet comprising a standard packet-type indicator comprising a standard unicast authentication packet indicator, wherein the standard packet-type indicator does not indicate a standard association request packet, the connection request packet containing (i) a (media access control (MAC) address of the first wireless device, (ii) a special information element that comprises an operation-type identifier that identifies a MAC layer virtual association request operation-type, and (iii) the network identifier, the first wireless device identifying the connection request packet as a virtual association request with respect to the IBSS ad hoc network based on the operation-type identifier, based on matching the MAC address of the first wireless device with the MAC address in the connection request packet, and based on matching the network identifier in the connection request packet with the network identifier of the IBSS ad hoc network; and responsive to identifying the connection request packet as a virtual association request: wirelessly associating with the second wireless device, sending a connection response packet to the second wireless device, and recording an indication of the association with the second wireless device.

9. A method as defined in claim 8, further comprising monitoring for packets from a third wireless device in the IBSS ad hoc network, and dissociating the third wireless device from the IBSS ad hoc network when determined that a packet has not been received from the third wireless device for a predetermined time.

10. A method as defined in claim 8, further comprising:
sending a disconnection request packet from the first wireless device to the second wireless device in response to a disconnection call, wherein the disconnection request packet comprises a standard unicast probe packet indicator or a standard unicast authentication packet indicator, and wherein the second wireless device responds to the disconnection request packet by dissociating from the first wireless device; and removing the second wireless device from a connected-devices list in further response to the disconnection call.

11. A method as defined in claim 8, further comprising:
receiving a disconnection request packet from the second wireless device and determining whether the disconnection request packet indicates a disconnection request based at least in part on whether a network identifier in the disconnection request packet matches the network identifier of the IBSS ad hoc network;
if the disconnection request packet is identified as a disconnection request, then removing the second wireless device from a connected-devices list; and
if the disconnection request packet is not identified as a disconnection request, then not removing the second wireless device from the connected-devices list.

12. A wireless device comprising:
a radio, processing hardware, and storage hardware storing instructions for the processing hardware; and
a wireless module that becomes operational when the instructions are executed by the processing hardware, the wireless module, when operating, logically connected with the radio and performing a process, when the wireless module is operational, comprising:
sending a connection request packet to a second wireless device that has been discovered by the wireless device, the connection request packet comprising a standard packet-type field containing either a standard unicast probe request packet-type indicator or a standard unicast authentication packet-type indicator, wherein the standard packet-type indicator does not indicate a standard association request packet, the connection request packet also containing (i) a (media access control (MAC) address of the second wireless device, (ii) a special information element that comprises an operation-type indicator that indicates a virtual association request with respect to the ad hoc network, and (iii) a network identifier of an independent basic service set (IBSS) ad hoc network, wherein the second wireless device is configured to send a corresponding connection response packet by recognizing that the connection request packet is an association request with respect to the IBSS ad hoc network based on the connection request packet containing the MAC address of the second wireless device, the operation-type indicator in the special information element, and the network identifier of the IBSS ad hoc network;
determining that the connection response packet corresponding to the connection request packet was received from the second wireless device within a timeout period, and in response joining the IBSS ad hoc network by associating with the second wireless device.

13. A wireless device as defined in claim 12, wherein the instructions further comprise instructions that when executed enable the wireless device to:
receive a second connection request packet from a third wireless device;
determine if the second connection request packet is a virtual association request, and when so determined send a second connection response packet to the third wireless device and record in the storage hardware an indication that a connection is established with the third wireless device.

14. A wireless device as defined in claim 12, wherein the instructions further comprise instructions that when executed enable the wireless device to:
receive a second connection request packet from the second wireless device before receiving the connection response packet from the second wireless device;
determine if the MAC address of the second wireless device meets a criteria with respect to a MAC address of the wireless device, and when so determined cause the wireless device to send a second connection response packet to the second wireless device and cause the wireless device to cancel its own connection request corresponding to the connection request packet; and determine if the MAC address of the second wireless device does not meet the criteria with respect to the MAC address of the wireless device, and when so determined cause the wireless device to not form a connection based on the second connection request.

15. A wireless device as defined in claim 14, wherein the criteria comprises a numeric comparison.

16. A wireless device as defined in claim 12, wherein the standard packet-type field contains a standard direct probe request packet indicator.

17. A wireless device as defined in claim 12, wherein the instructions further comprise instructions that when executed identify the connection request packet by matching the connection request packet with a predetermined packet pattern.

18. A wireless device as defined in claim 12, wherein the instructions further comprise instructions that when executed monitor for packets from a third wireless device and dissociate from the third wireless device responsive to determining that a packet is not received from the third wireless device for a predetermined time.

* * * * *